United States Patent [19]

Lisart et al.

[11] Patent Number: 5,500,601
[45] Date of Patent: Mar. 19, 1996

[54] DEVICE FOR DETECTING THE LOGIC STATE OF A MEMORY CELL

[75] Inventors: Mathieu Lisart, Aix en Provence; Richard Fournel, Trets, both of France

[73] Assignee: SGS-Thomson Microelectronics, S.A., United Kingdom

[21] Appl. No.: 839,618

[22] Filed: Feb. 21, 1992

[30] Foreign Application Priority Data

Feb. 21, 1991 [FR] France .................................. 91 02090

[51] Int. Cl.$^6$ .......................... G04R 27/08; G04R 31/26; G11C 29/00
[52] U.S. Cl. .......................... 324/713; 324/765; 371/21.4
[58] Field of Search .......................... 325/158 R, 73.1, 325/713; 371/21.1, 21.4, 22.1; 307/530; 327/51, 52; 324/765

[56] References Cited

U.S. PATENT DOCUMENTS

| | | | |
|---|---|---|---|
| 4,136,292 | 1/1979 | Suzuki et al. ........................... | 307/355 |
| 4,519,076 | 5/1965 | Priel et al. ........................... | 371/21.4 |
| 4,720,671 | 11/1968 | Tada et al. ........................... | 324/73.1 |
| 4,774,692 | 9/1980 | Oishi et al. ........................... | 307/530 |

FOREIGN PATENT DOCUMENTS

| | | |
|---|---|---|
| 1465485 | 1/1967 | France . |
| 3634052 | 4/1988 | Germany . |
| 02045559 | 5/1990 | Japan . |

*Primary Examiner*—Walter E. Snow
*Attorney, Agent, or Firm*—Felsman, Bradley, Gunter & Dillon

[57] ABSTRACT

The invention is a device to detect the logic state of a component whose impedance depends on this state, the device including means to generate a current and a measurement voltage so that the current consumption remains constant during cell detection regardless of the state detected, the device also including means to detect the logic state of the component.

11 Claims, 2 Drawing Sheets

DEVICE FOR DETECTING THE LOGIC STATE OF A MEMORY CELL

BACKGROUND OF THE INVENTION

1. Field of the Invention

The invention is a device to detect the logic state of a component whose impedance varies with its logic state. The invention particularly applies to the detection of the logic state of any component whose state is detected by measuring a current.

It is particularly applicable to reading memory cells which, in most cases, do not have the same impedance when in the programmed state as when in the complementary state following erasure. This particularly applies to PROM, EPROM, ROM and EEPROM cells.

2. Description of the Prior Art

An example of a component logic state detection device L complying with the prior art is represented in FIG. 1. As will be described in detail, based on the use of such a device to read a memory cell, a major disadvantage of the prior art device is that it shows a variation in current consumption which can be measured from outside the circuit in which the device is integrated. Consequently, it is only necessary to measure the current from outside the circuit to determine the logic state of the measured internal component.

To determine the logic state of a memory cell CEL, an amplifier AM is connected, via a transistor T1, to terminal BL which is connected to the bit line in the memory. A second transistor T2 is included so that node A, which is the common point between one electrode of transistor T1 and one electrode of transistor T2, is connected to the input to amplifier AM.

A reference voltage Vref is applied to the gate of transistor T2 and a supply voltage Vcc is applied to the second electrode of the transistor. Transistor T2 is therefore polarized by voltage Vref and generates a current IR.

The memory cell is selected by applying a required voltage SBL to the gate of transistor T1. When a cell is selected, it is possible to read it by applying a read voltage to the cell WL input and a voltage CG to the cell control gate input.

Depending on whether the cell logic state is "programmed" or "erased", the cell will draw current IC and the voltage at node A will drop. In addition, if the impedance of the cell is high, current IC is roughly zero and the voltage at node A is close to Vcc.

If the cell impedance is low, current IC will be positive and the voltage at node A will drop. Amplifier AM can therefore detect the logic state of the cell by detecting whether there is a voltage drop or not. This variation in current can be measured across the external terminals of the memory containing the cells read in this way.

As an example, the current is approximately 50 µA when reading a cell whose programmed logic state corresponds to a voltage VT=2.5 V and is less than 1 µA when the cell is erased. The variation in current measured is therefore approximately 50 µA. This variation is larger than any noise in the power supply and can, therefore, easily be detected by a picoammeter.

This possibility of determining the logic state of cells from outside the memory by measuring current variations is a considerable disadvantage if the memory contains data which must remain secret.

SUMMARY OF THE INVENTION

This invention aims to overcome this disadvantage. The invention, as set forth in the claims, resolves the problem of creating a device to detect the logic state of a component in a way in which the current variations cannot be detected from outside. With a device complying with the invention, the current variations which can occur at detection are sufficiently small to be confused with the noise in the power supply.

In particular, an object of the invention is to provide a device capable of detecting the logic state of a component whose impedance varies with its logic state, and includes: current generation means to generate a current so that the current consumption is constant regardless of the component state; voltage generation means to generate a measurement voltage proportional to the current consumed by the component; and measurement means to measure this voltage.

Another characteristic of the invention is that the measurement means include: means to generate a reference voltage; comparison means to compare the voltage being measured with the reference voltage.

Another characteristic of the invention is that the current generation circuit includes a current source connected to the voltage generation means, these means being connected in parallel with the component.

Another characteristic of the invention is that the voltage generation means include a first resistor.

Another characteristic of the invention is that the means to generate a reference includes a current source connected to a second resistor.

In a preferred embodiment, the comparison means include a differential amplifier, the voltage across the terminals of the first resistor being applied to one amplifier input and the voltage across the terminals of the second resistor being applied to the second amplifier input. The amplifier outputs a signal which changes from one logic state to the complementary logic state depending on the logic state of the component being measured.

Preferably, the current sources are constant current sources.

Another characteristic of the invention is that the component is a memory cell whose impedance varies depending on whether its logic state is programmed or erased.

Another aspect of the invention is that the device is connected to all the cells in a memory, each cell being selected in succession so that the cells are read one after the other.

BRIEF DESCRIPTION OF THE DRAWINGS

The invention will be better understood and other advantages will become clear upon reading the following description illustrated by the appended figures in which.

DESCRIPTION OF THE PREFERRED EMBODIMENT

Figure 1:
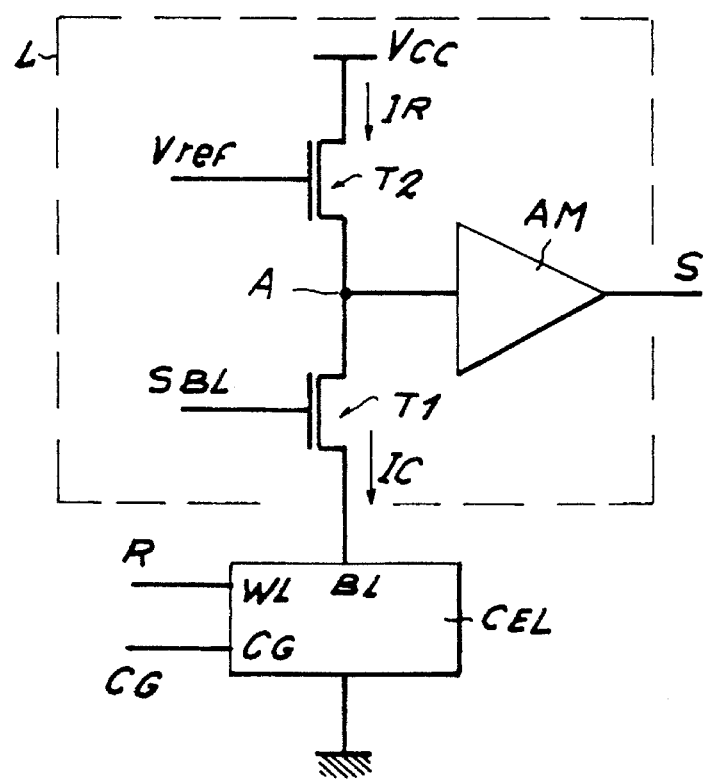
FIG. 1 is a circuit diagram of a read device complying with the prior art.

FIG. 1, which complies with the prior art, has already been described and will not be discussed further.

Figure 2:
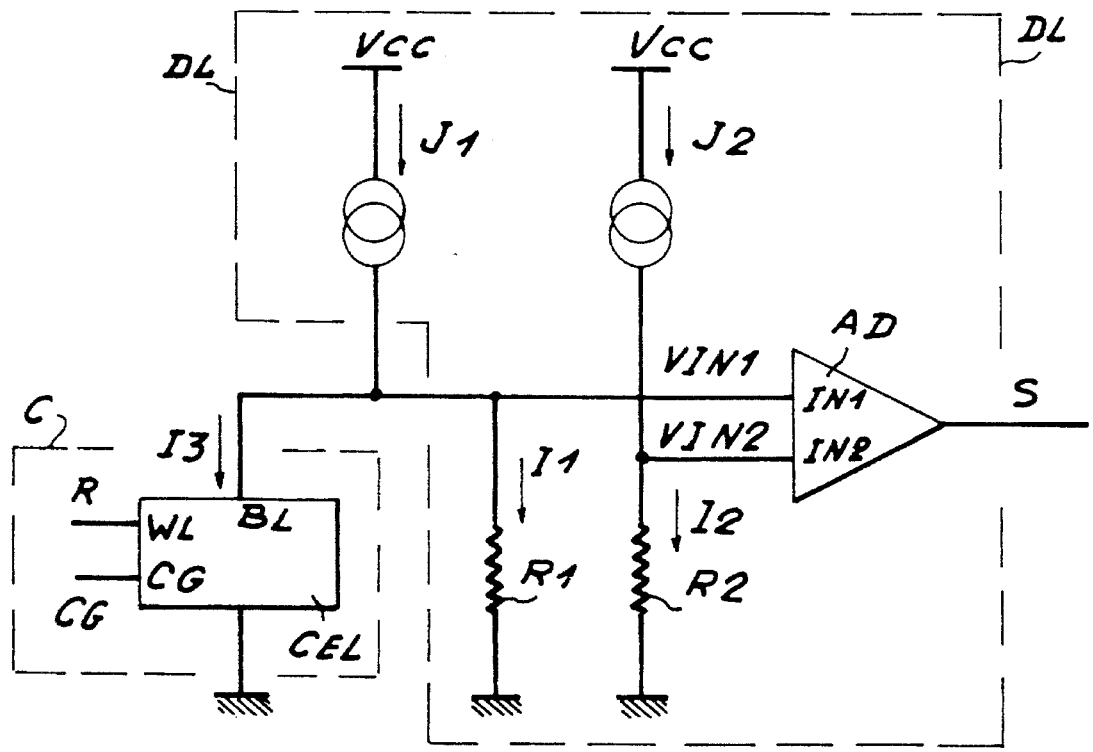
FIG. 2 is a circuit diagram of a read device DL complying with this invention.

FIG. 2 illustrates a detection device DL complying with the invention. As an example, this device is used to read a memory cell. However, this is only an example to illustrate the principle, since the memory cell could be replaced by any other component C whose impedance varies with its logic state.

The device includes a current source J1 connected to a resistor R1, this circuit being connected across the terminals of a supply voltage Vcc.

Resistor R1 is connected in parallel with the cell CEL to be read. The current source J1 and resistor R1 form means which generate a current and a measurement voltage. This circuit ensures that the current consumption remains constant regardless of the logic state of the memory cell but still allows this state to be detected.

When the cell is read and becomes conductive, the conductive state corresponds to a given logic state which may either be "programmed" or "erased", depending upon the convention used in programming. The memory cell then has a low impedance and a current I3 flows such that I3≈J1. When the cell is not conductive, its impedance is high and the value of resistor R1 is chosen to obtain a current I1 such that I1≈J1.

The logic state of the memory cell is detected by means which measure the voltage across the terminals of resistor R1. These means may include an amplifier. Preferably, these means include a reference voltage generator and comparison means. The reference voltage generator includes a current source J2 connected to a resistor R2 through which a current I2 flows such that J2=I2.

The comparison means consist of a differential amplifier AD, the voltage across the terminals of resistor R1 being applied to its input IN1 and the voltage across the terminals of resistor R2 being applied to its other input IN2. When the cell is read and is in a logic state such that a current I3 is absorbed, a voltage VIN1, less than VIN2, is applied to input IN1 of the amplifier AD.

In the complementary logic state, a current I1 flows through resistor R1. A voltage VIN1 greater than or equal to VIN2 is then applied to input IN1. The value of R1 is chosen to obtain constant consumption regardless of the memory cell logic state and the difference in the values of voltage VIN1 corresponding to these two states is adequate.

The differential amplifier outputs a signal S which will be a high or low logic state depending on whether VIN1 is greater than (or equal to) VIN2 or less than VIN2. The logic state of signal S indicates the state of the cell read.

Figure 3:
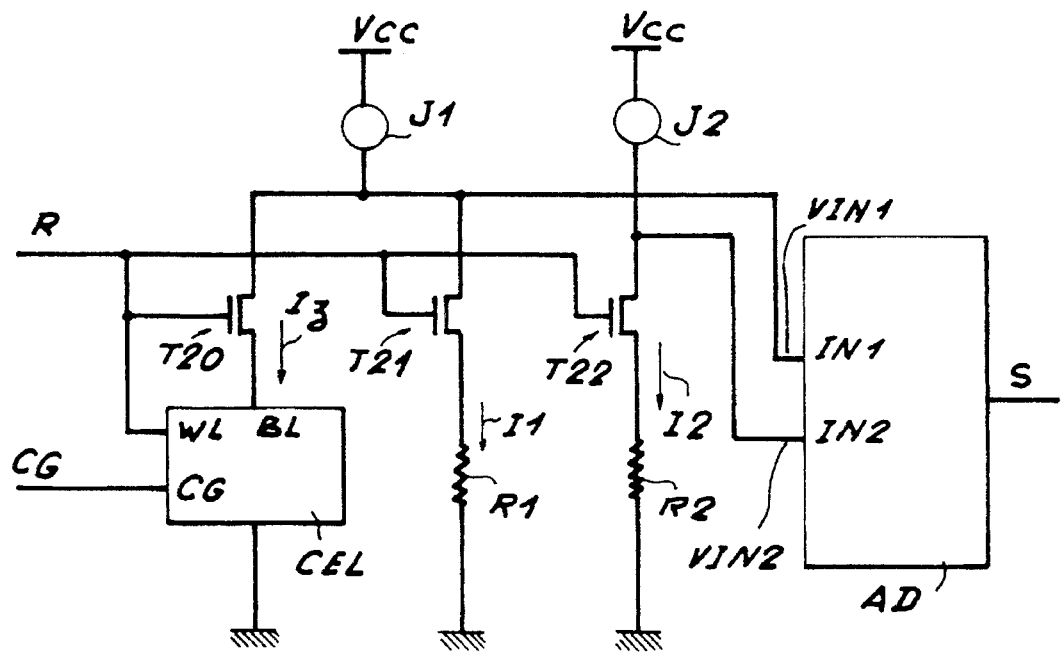
FIG. 3 is a detailed diagram of the connections between device DL and a memory cell selected in a column and a row of a memory.

FIG. 3 shows the connections to one memory cell selected from a column of memory cells and the cells in a row. Cell CEL is selected to be read in the conventional way by applying a read voltage R to the word line (WL).

Applying this voltage to the "WL" selects the row which contains the cell. This read voltage R is also applied to the gate of transistor T20 to select the cell in the bit line which contains it. One electrode of transistor T20 is connected to the cell input BL and the other electrode to a current source J1. An appropriate voltage CG is applied to the cell control gate input.

A transistor T21 is included to connect source J1 to resistor R1; this connection becomes conductive when a voltage is applied to the transistor gate. Transistor T22 is included to connect source J2 to resistor R2, this connection also becoming conductive when a voltage is applied to the transistor gate. These voltages can be read voltage R.

Figure 4:
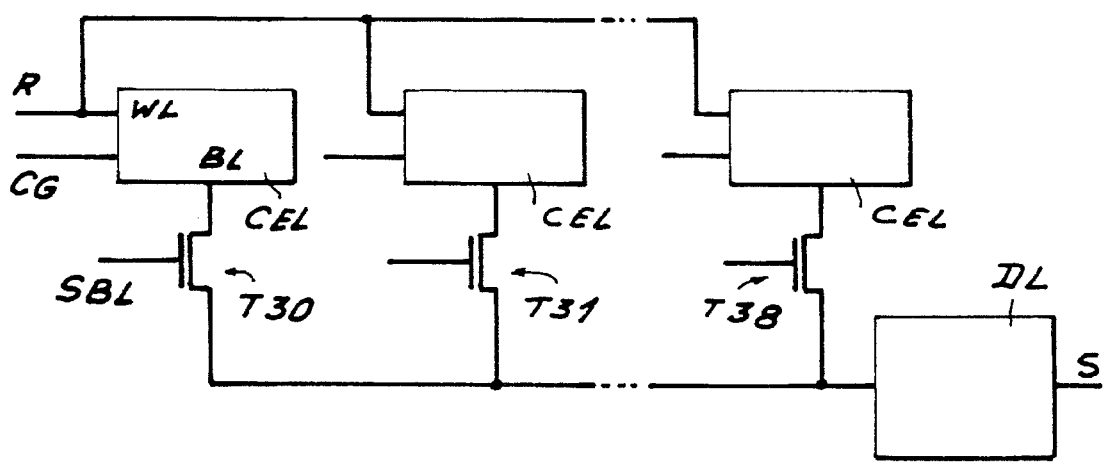
FIG. 4 is a diagram detailing the connections between the device and a set of cells in a memory selected to be read.

FIG. 4 represents a device DL connected to a set of memory cells selected to be read in a memory (not shown.)

The read voltage R is applied to the WL inputs of the cells in this set. By selecting each of the cells in succession, the device makes it possible to read the binary word formed by the logic states of all the cells in the set.

Transistors T30, T31, . . . , T37 are each triggered in succession to read these cells. Consequently, the device complying with the invention can be designed for a given number of memory cells to be read during the same read sequence.

The device can be connected to several rows in a memory, to allow these rows to be read one after the other. However, n devices DL are required to simultaneously read the state of n components.

What is claimed is:

1. A device to detect the logic state of a memory cell whose impedance varies depending on whether its logic state is a programmed or erased state, the device including:

current generation means to maintain the current consumption of the device constant regardless of the state of the memory cell, voltage generation means to generate a measurement voltage proportional to the current consumed by the memory cell, and measurement means to measure said voltage, wherein the measurement means include means to generate a reference voltage and comparison means to compare the voltage to be measured with the reference voltage, wherein the voltage generation means include a first resistor and the comparison means include a differential amplifier in which the voltage across the terminals of the first resistor are applied to one amplifier input and the voltage across the terminals of the second resistor are applied to the second amplifier input, the amplifier output having a signal which changes from one logic state to the complementary logic state depending on the logic state of the memory cell.

2. A device as described in claim 1 in which the current generation means include a current source connected to the voltage generation means, these means being connected in parallel with the memory cell.

3. A device as described in claim 1, in which the voltage generation means include a first resistor.

4. A device as described in claim 1, in which the means to generate a reference voltage include a current source connected to a second resistor.

5. A device as described in claim 1, in which the current sources are constant current sources.

6. A device as described in claim 1, in which this device is connected to all cells in a memory, each cell being selected in succession to read the cells one after the other.

7. A circuit for use on a memory device having a plurality of programmable memory cells, each cell having an impedance state which is high or low depending on whether it is programmed, comprising:

a first constant current source;

a first load device, wherein the first load device generates a sensed voltage proportional to a current flowing therethrough;

means for connecting a memory cell in parallel with the first load device, the parallel combination being connected in series with the first constant current source, wherein the current generated by the first constant current source flows primarily through the cell when the cell is in a low impedance state, and primarily through the first load device when the cell is in a high impedance state;

means for generating a reference voltage, such means drawing a constant current; and comparison means for comparing the reference voltage with the sensed voltage and for generating an output signal indicating which voltage is greater;

wherein the current supplied to the circuit is constant regardless of the impedance state of a memory cell attached to it, whereby the impedance state of the attached cell cannot be determined from measuring the current level supplied to the circuit by a supply.

8. The circuit of claim 7, wherein the means for generating a reference voltage comprises a second constant current source in series with a resistive load.

9. The circuit of claim 7, wherein the comparison means comprises a voltage comparator.

10. The circuit of claim 7, wherein the first load device comprises a resistor.

11. The circuit of claim 7, wherein the means for connecting a memory cell in parallel with the first load device further comprises means for sequentially connecting a plurality of memory cells in parallel with the first load device for sequentially sensing the impedance state of such plurality of memory cells.

* * * * *